(12) United States Patent
Bardon

(10) Patent No.: US 7,537,633 B2
(45) Date of Patent: May 26, 2009

(54) FILTER UNIT FOR FILTERING PARTICLES CONTAINED IN EXHAUST GAS OF AN INTERNAL COMBUSTING ENGINE

(75) Inventor: Sébastien Bardon, Lyons (FR)

(73) Assignee: Saint-Gobain Centre de Recherches et d'Etudes Europeen, Courbevois (FR)

( * ) Notice: Subject to any disclaimer, the term of this patent is extended or adjusted under 35 U.S.C. 154(b) by 490 days.

(21) Appl. No.: 10/564,838

(22) PCT Filed: Jul. 15, 2004

(86) PCT No.: PCT/FR2004/001855

§ 371 (c)(1),
(2), (4) Date: Jan. 17, 2006

(87) PCT Pub. No.: WO2005/016491

PCT Pub. Date: Feb. 24, 2005

(65) Prior Publication Data

US 2006/0168928 A1    Aug. 3, 2006

(30) Foreign Application Priority Data

Jul. 18, 2003    (FR)    ................... 03 08776

(51) Int. Cl.
*B01D 46/00* (2006.01)
*F01N 3/022* (2006.01)

(52) U.S. Cl. .................. 55/523; 55/282.2; 55/282.3; 55/385.3; 55/482; 55/484; 55/524; 55/DIG. 5; 55/DIG. 10; 55/DIG. 30; 60/311; 428/116

(58) Field of Classification Search ............... 55/282.2, 55/282.3, 385.3, 482, 484, 523, 524, DIG. 5, 55/DIG. 10, DIG. 30; 60/311; 428/116, 428/117, 118
See application file for complete search history.

(56) References Cited

U.S. PATENT DOCUMENTS

| | | | |
|---|---|---|---|
| 4,276,071 A | | 6/1981 | Outland |
| 4,364,761 A | * | 12/1982 | Berg et al. .................. 55/523 |
| 4,416,676 A | | 11/1983 | Montierth |
| 5,300,133 A | * | 4/1994 | Schuster et al. ........ 55/DIG. 30 |
| 5,873,998 A | | 2/1999 | Grangeon et al. |
| 6,843,817 B2 | * | 1/2005 | Noda et al. ............... 55/282.3 |
| 6,887,826 B2 | * | 5/2005 | Nishimura et al. .......... 501/118 |
| 2003/0041730 A1 | | 3/2003 | Beall et al. |
| 2005/0076627 A1 | * | 4/2005 | Itou et al. .................... 55/523 |

FOREIGN PATENT DOCUMENTS

| | | |
|---|---|---|
| DE | 100 37 403 | 2/2002 |
| FR | 2 473 113 | 7/1981 |
| FR | 2 789 327 | 8/2000 |

* cited by examiner

*Primary Examiner*—Jason M Greene
(74) *Attorney, Agent, or Firm*—Young & Thompson

(57) ABSTRACT

The inventive filter unit for filtering particles contained in exhaust gas of an internal combusting engine comprises sets of imbricated input channels (10, 11) and adjacent output channels (12, 13) which are fluidly communicating by means of the lateral walls thereof. Said lateral walls are cross-sectionally provided with a corrugation which is determined in such a way that the total volume of the input channels (10, 11) is increased with respect to that of the output channels (12, 13), whereby the total volume (Ve) of the input channels (10, 11) being greater than that (Vs) of the output channels (12, 13).

12 Claims, 5 Drawing Sheets

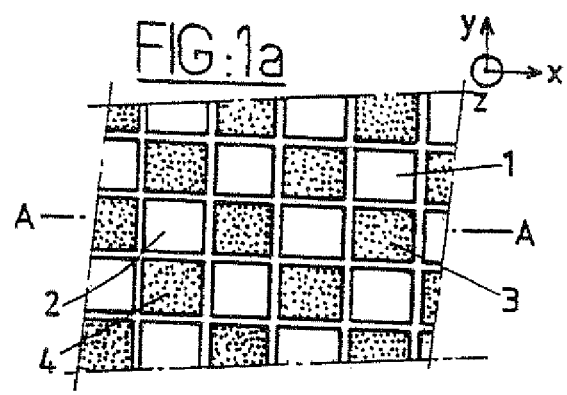
Prior Art
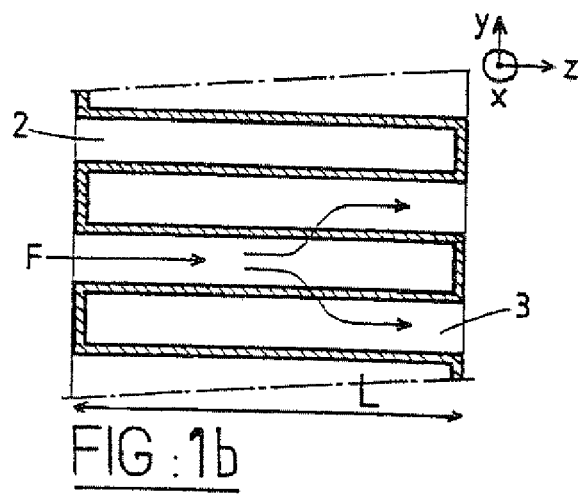
Prior Art
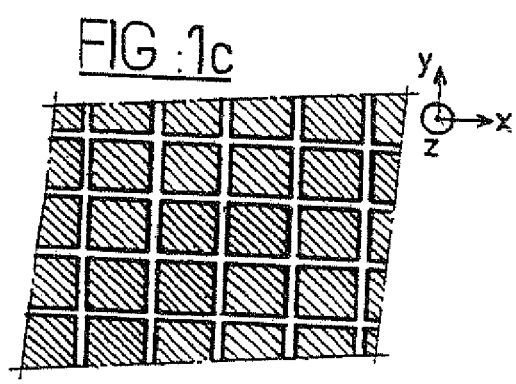
Prior Art

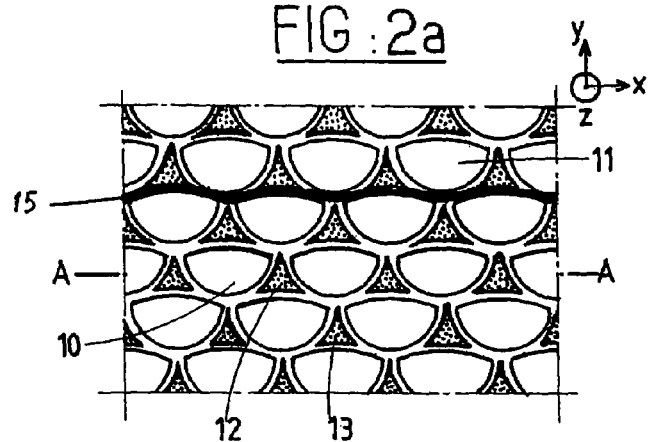
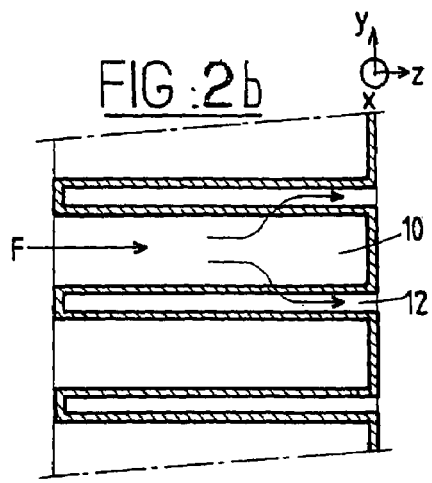
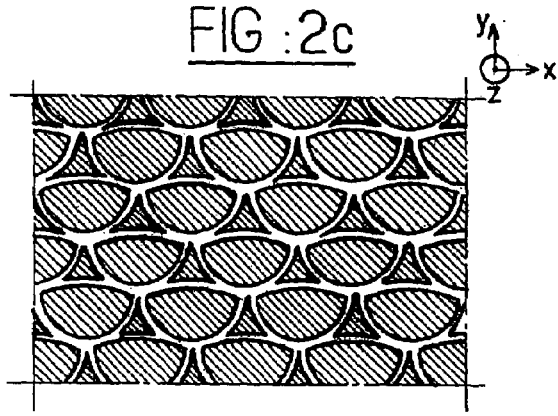

FILTER UNIT FOR FILTERING PARTICLES CONTAINED IN EXHAUST GAS OF AN INTERNAL COMBUSTING ENGINE

The invention relates to a filter unit for filtering particles contained in the exhaust gas of an internal combustion engine, in particular of the diesel type, and to a filter body including at least one filter unit according to the invention.

BACKGROUND OF THE INVENTION

Porous honeycomb structures are used as filter bodies for filtering particles emitted by diesel vehicles. These filter bodies are generally made of ceramic (cordierite, silicon carbide, etc.). They may be monolithic or consist of separate units. In the latter case, the units are cemented together by means of a ceramic cement. The whole is then machined to the required section, which is generally circular or elliptical. The filter body includes a plurality of passages. It is inserted into a metal enclosure. Each passage is blocked at one or the other of its ends. There are therefore inlet passages and outlet passages. The exhaust gases are therefore constrained to pass through the lateral walls of the inlet passages into the outlet passages; thus particles and soot are deposited in the filter body.

After a certain time of use, soot accumulates in the passages of the filter body, which increases the head loss caused by the filter and degrades the performance of the engine. For this reason, the filter body must be regenerated regularly, conventionally after about 7 to 10 hours of operation, when the head loss has reached a value of approximately 150 dPa (for an engine of about 2 liters cubic capacity driving on a motorway with a filter body of approximately 4 liters).

Regeneration consists in oxidizing the soot. To this end, it is necessary to heat the soot since the temperature of the exhaust gases is of the order of 300° C. whereas the flash point temperature of the soot is more of the order of 600° C., under normal operating conditions. Despite such regeneration, combustion residues remain in the filter body. Accordingly, the head loss induced by the filter body after regeneration is always higher than that induced by the filter body before regeneration. This phenomenon of clogging continues on each regeneration and it is necessary for the dealer to clean the filter block completely, for example every 80 000 km. This cleaning constitutes a drawback to the use of filter bodies.

FR 2 473 113 proposes a filter body that can be produced by extrusion and has inlet passages of greater cross section than the outlet passages. The authors indicate a filtering area of the filter unit of 7.89 $cm^2/cm^3$ (i.e. 0.789 $cm^2/l$) with a constant inlet passage cross section less than 12.9 $mm^2$ and a wall thickness less than or equal to 0.7 mm.

However, the filter body described in FR 2 473 113 induces a high head loss, which means that the filter body must be regenerated frequently. It is therefore difficult to envisage the industrial use of this filter body.

There is therefore a need for a filter body having a low head loss throughout its service life and therefore necessitating less frequent cleaning. The invention aims to meet that need.

SUMMARY OF THE INVENTION

The invention relates more particularly to a filter unit for filtering particles contained in the exhaust gases of an internal combustion engine, comprising interleaved sets of adjacent inlet passages and outlet passages, said inlet and outlet passages being in fluid communication through their lateral walls, said lateral walls having, in cross section, an undulation determined to increase the overall volume of said inlet passages at the expense of that of the outlet passages, and the overall volume of the inlet passages being greater than that of the outlet passages, noteworthy in that:
  the hydraulic diameter of said outlet passages is from 0.9 to 1.4 mm, preferably greater than 0.95 mm,
  the ratio r of the overall volume of the inlet passages to the overall volume of the outlet passages is from 1.15 to 4, preferably greater than 1.35 and/or less than 3,
  the filtering area is from 0.825 $m^2$ to 1.4 $m^2$ per liter of said filter unit, preferably greater than 0.92 $m^2$
  the ratio of asymmetry of said undulation is less than 20%.

As will emerge in more detail hereinafter, this significantly reduces the head loss induced by the filter unit and therefore reduces the frequency of regeneration of the filter body of which it forms part.

According to other preferred features of the invention:
  said outlet passages have a cross section of constant area throughout the length of said filter unit;
  said inlet and outlet passages are straight and parallel;
  said inlet and outlet passages are arranged relative to each other so that all of the gas filtered by any inlet passage passes into outlet passages adjacent said inlet passage;
  said undulation has a sinusoidal shape in cross section; the ratio of asymmetry of said undulation is less than 15%, preferably less than 12%, and/or greater than 5%, preferably greater than 6%;
  said undulation is periodic and a half-period of said undulation extends over the width of one of said channels;
  said inlet and outlet channels are disposed alternately in any horizontal row or vertical row of said unit, thus forming a checkerboard structure on the front or rear face of the unit.

The invention also relates to a filter body intended for a particle filter that is noteworthy in that it includes at least one filter unit according to the invention.

BRIEF DESCRIPTION OF THE DRAWINGS

The following description with reference to the appended drawings and the examples explain the invention and its advantages. In the drawings:

FIG. 1a is a partial view of the front face (i.e. that on which the exhaust gases impinge) of a prior art filter unit, FIG. 1b is a view of that unit in section taken along the line AA in FIG. 1a, and FIG. 1c is a view in cross section of an extrusion die for producing the above filter unit, FIGS. 2a to 2c are views analogous to those of FIGS. 1a to 1c, respectively, and show a first embodiment of a filter body of the invention.

Figure 3:
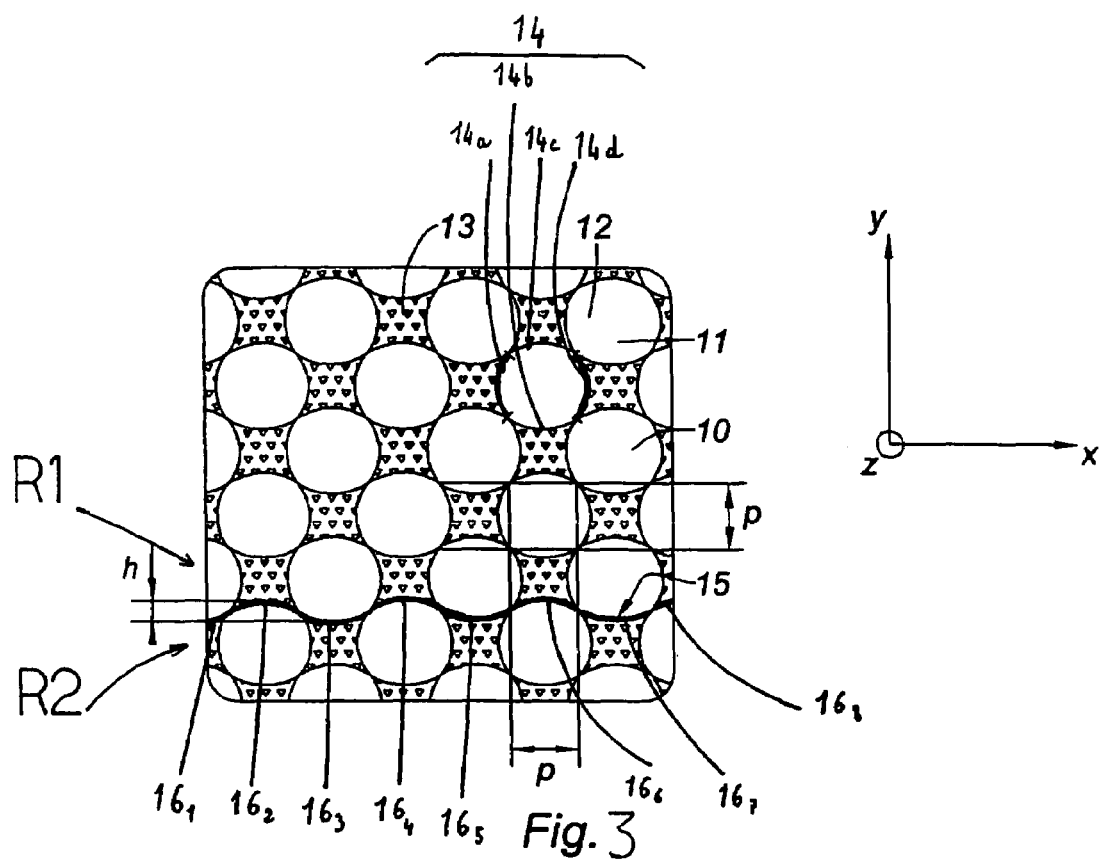
FIG. 3 is a partial view of the front face of a second embodiment of a filter unit of the invention.

All of FIGS. 1 to 3 correspond to partial views of filter units and may be regarded as a partial view of a monolithic filter body or a partial view of a filter body formed by assembling filter units.

In the figures, the thickness of the walls between the passages is not to scale and is not limiting on the invention.

DETAILED DESCRIPTION OF THE PREFERRED EMBODIMENTS

FIG. 1a is a diagram of the front face of a filter unit currently used to trap particles contained in the exhaust gases of motor vehicles propelled by a diesel engine. This filter unit has identical passages whose cross section is square and of constant size throughout the length of the filter body. On this front face, one in two passages is blocked. The passages 1 and 2 are open and therefore constitute inlet passages. The passages 3 and 4 are blocked and therefore constitute outlet passages. FIG. 1b is a view in longitudinal section taken along the line AA in FIG. 1a. The flow F of exhaust gases enters the filter unit via the inlet passages and then passes through the lateral walls of the passages into the outlet passages. FIG. 1c is a view in cross section of the extrusion die used to fabricate the filter units used at present and represented in FIG. 1a. In this view, the solid lines represent machined openings through which the ceramic can pass.

FIG. 2a is a diagram of the front face of a first embodiment of a filter unit of the invention. The passages 10 and 11 are open and constitute inlet passages. The passages 12 and 13 are blocked and constitute outlet passages. The passages are arranged in an array of passages having a triangular cross section that is deformed to increase the overall volume of the inlet passages at the expense of that of the outlet passages. Thus a non-plane intermediate wall between an inlet passage and an outlet passage may be concave on the side of the inlet passage, as shown in FIG. 2a, and convex on the side of the outlet passage.

FIG. 2b is a view in section taken along the line AA in FIG. 2a. The flow F of exhaust gases enters the filter body via the inlet passages and passes through the walls of the passages into the outlet passages. Because of the increase in the overall volume of the inlet passages referred to above, the area available on the walls of the inlet passages, or "filtering area", is increased to the detriment of that of the outlet passages compared to a prior art filter body such as that shown in FIG. 1.

All of the area of the inlet passages is advantageously used to filter the exhaust gases, as there are no portions of one or more inlet passages that open into other inlet passages, such portions being of no utility for filtration since the exhaust gases can pass through them in both directions.

The inlet passages and outlet passes are preferably parallel and straight. It is therefore possible to produce the filter unit of the invention by extrusion, which is advantageous.

FIG. 2c is a view in cross section of the extrusion die used to produce the filter unit shown in FIG. 3a; in this view the solid lines represent machined openings through which the ceramic may pass. This die is used to fabricate passages of constant cross section throughout the length of the filter unit, which facilitates extruding them.

The passages are straight along the length of the filter body. Accordingly, in longitudinal section (see FIG. 2b), the passages have a constant cross section throughout their length L. This facilitates the fabrication of the filter units.

The inlet passages have a greater cross section than the outlet passages in order to increase the volume available for storing soot. The inlet passages and the outlet passages are arranged with respect to each other so that all of the gas filtered by any inlet passage passes into outlet passages adjacent that inlet passage, which optimizes the surface area available for a given filter unit volume.

FIG. 3 is a diagram of the front face of another embodiment of a filter unit of the invention. The passages 10 and 11 are open and constitute inlet passages. The passages 12 and 13 are blocked and constitute outlet passages. The passages are organized in an array of passages having a square cross section that is deformed to increase the overall volume of the inlet passages at the expense of that of the outlet passages. In any horizontal row (x) or vertical row (y), the inlet and outlet channels are disposed alternately, forming a checkerboard structure. The lateral wall 14 of an inlet passage 11 is therefore formed of four lateral wall portions 14a-14d separating the interior volume of that passage from the interior volumes of the four respective adjacent outlet passages.

A non-plane intermediate wall 15 between two horizontal rows $R_1$ and $R_2$, and/or two vertical rows, of passages (and thus formed by a set of portions of lateral walls $16_1$ to $16_8$ of those passages) is preferably concave on the side of the inlet passages and convex on the side of the outlet passages.

Along a horizontal row (along the x axis) or a vertical row (along the y axis) of passages, the intermediate wall 15 preferably has an undulating or "wavy" shape in cross section, the wall 15 undulating by substantially one half of an undulation length across the width of a passage.

The "length" of an undulation is the distance between two points of the undulation located at the same height with the same direction of variation of slope. In the case of a periodic undulation, the "length" of the undulation is called the "period".

The undulation is preferably periodic, but the amplitude of the undulations may be constant or variable. The amplitude is preferably constant. It is also preferable if the undulation has a sinusoidal shape whose half-period is equal to the pitch "p" of the array of passages, as shown in FIG. 3.

Finally, it is preferable if all the vertical or horizontal intermediate walls 15 of a unit have an undulation of exactly the same shape in cross section.

Figure 4:
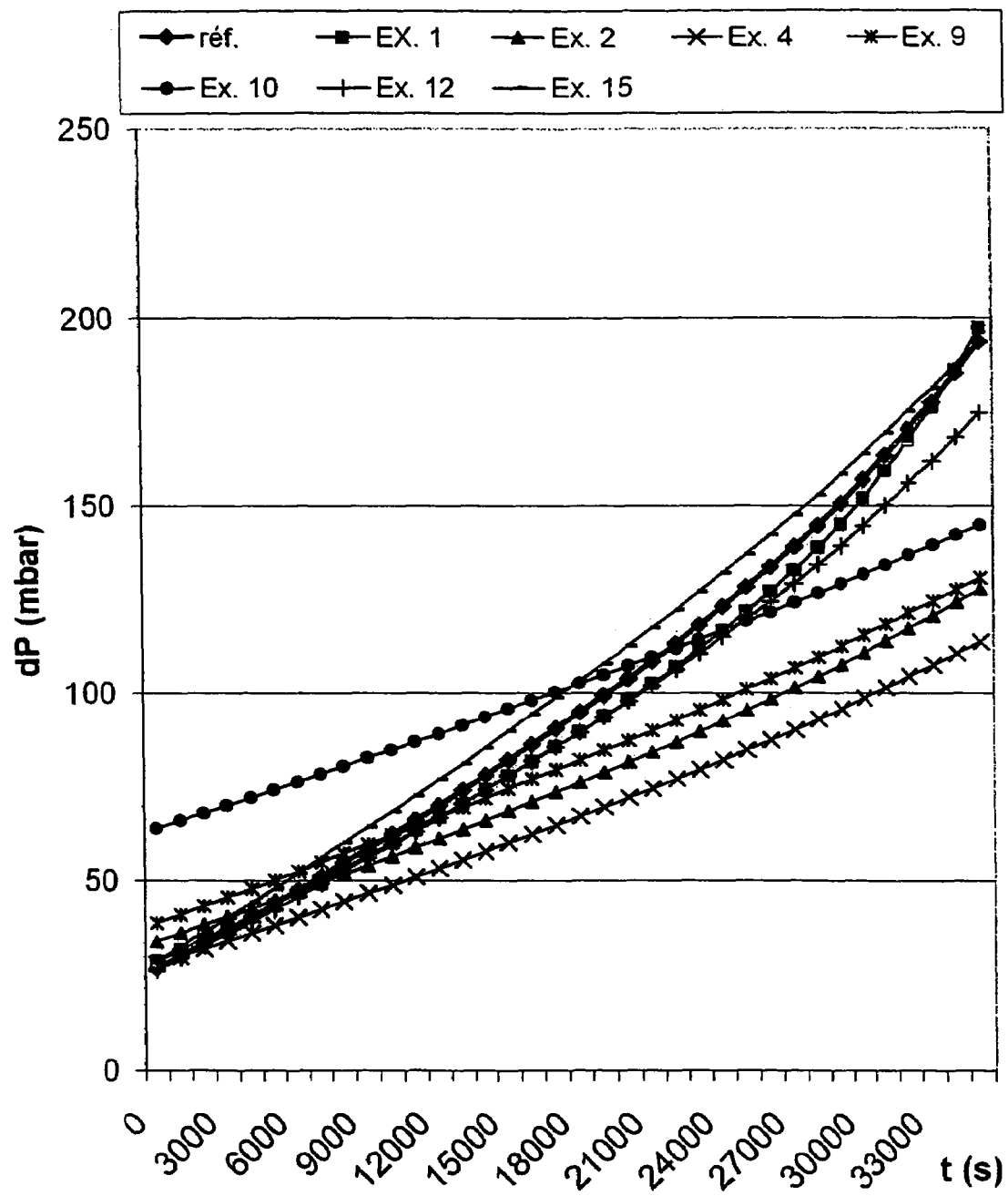
FIG. 4 is a graph representing the head loss as a function of the time of use for various new, "clean", tested filter bodies.
Figure 5:
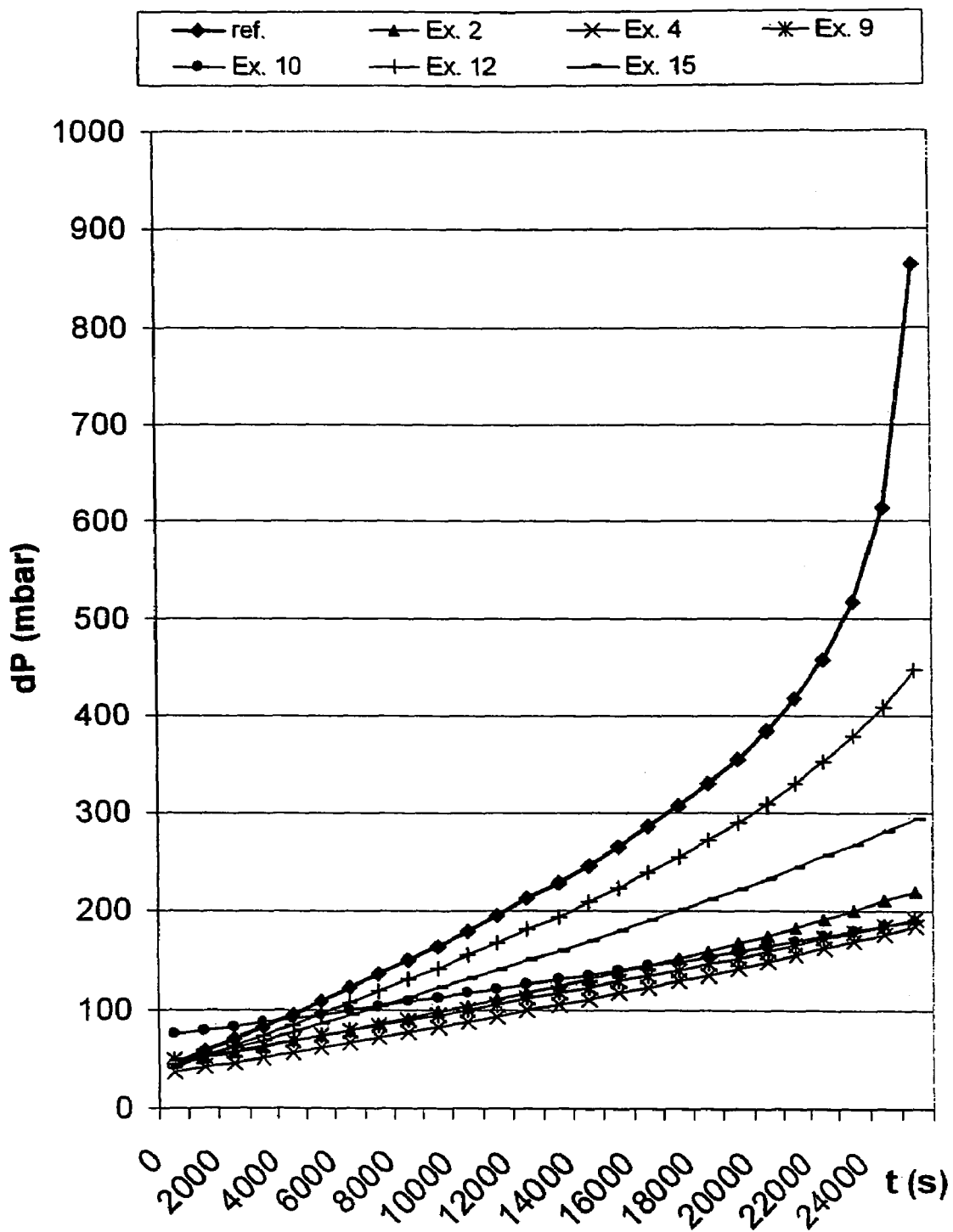
FIG. 5 is a graph representing the head loss as a function of the time of use for various tested filter bodies in which the combustion residues occupy a volume corresponding to 50% of the volume of the inlet passages of the reference filter, which corresponds to a distance traveled by the vehicle of approximately 80 000 km. Such filter bodies are referred to as "clogged". The residues are generally in the far end of the inlet passage.

The expression "ratio of asymmetry" refers to the ratio between the amplitude "h" and the half-length of said undulation (or between the amplitude "h" and the half-period in the case of a periodic undulation). The following examples summarized in table 1 are provided by way of illustration and are not limiting on the invention. FIGS. 4 and 5 represent curves of the increasing head loss as a function of time corresponding to certain examples from table 1, with clean and clogged filters, respectively.

The filter bodies that were tested were produced by assembling 16 filter units fastened together by means of a joint 1 mm thick. These filter bodies were cylindrical with a diameter of 144 mm and a length of 9 inches (228.6 mm). The passages were of the type represented in FIG. 4, the walls having a substantially sinusoidal profile and the outlet and inlet passages having a cross section of constant area through the length L of the filter body.

For the purposes of the calculations, the exhaust gases were introduced into the inlet passages of the filter bodies under test at a temperature of 250° C. and a flowrate of 320 m³/hour. The concentration of particles in the exhaust gases was $2.2*10^{-5}$ kg/m³.

For the clogged filter body tests, the concentration of combustion residues in the inlet passages was $1.8*10^{-9}$ m³/m³ of exhaust gas.

The reference example "Ref" corresponds to a filter constituted by assembling 16 filter units fastened together with a joint 1 mm thick. This filter was cylindrical with a diameter of 144 mm and a length of 9 inches (228.6 mm). The passages were of the type represented in FIG. 1, the outlet and inlet passages having a square cross section of constant area through the length L of the filter body. The pitch of the array was 1.8 mm and the thickness of the walls was 350 μm.

The filtering areas, passage volumes and head losses were calculated by the Institut de Mécaniques des Fluides of Toulouse (France).

The expression "hydraulic diameter" used in relation to a cross section or a passage refers to the ratio between four times the section of the passage and the perimeter of the passage.

The passage density is expressed as a number of passages per square inch (cells per square inch (cpsi)).

Ve denotes the total volume of the inlet passages, Vs the total volume of the outlet passages. The ratio r is defined as follows: r=Ve/Vs.

The expression "filtering area" refers to the area of the walls of the inlet passages through which the flow of gas to be filtered can pass. The filtering area is evaluated in square meters per liter of filter unit.

The performance of a filter body is evaluated by measuring the time "t" in minutes to reach a particular head loss "dP" and by the initial head loss (dP for t=0). The measured time "t" in minutes to achieve a head loss "dP" of x mbar is denoted $t_{/x}$.

It is considered advantageous for a filter body to conform to the following criteria:
initial head loss<50 mbar;
$t_{/100} \geq 300$ for a clean filter;
$t_{/150} \geq 500$ for a clean filter;
$t_{/150} \geq 200$ for a clogged filter.

ineffective because it is covered by the combustion residues is therefore lower. The induced head loss is therefore lower. Between two regenerations, the head loss induced by the filter body therefore increases more slowly.

Moreover, the large volume in the inlet passages can store a greater quantity of combustion residues. The number of regenerations before removing/refitting the filter can therefore be increased.

For a constant wall thickness, an increase in the ratio of asymmetry implies an increase in the storage capacity of the inlet passages and an increase in the filtering area of the unit.

However, the ratio of asymmetry must not be increased excessively, as this could reduce the section of the outlet passages to the point of a prejudicial increase in the head loss.

A compromise must therefore be arrived at. The ratio of asymmetry is less than 20%, preferably less than 15%, more preferably less than 12%, and greater than 5%, preferably greater than 6%.

According to the invention, the time between two filter body demounting/cleaning operations is therefore increased not only because of reduced residual clogging of the filtering area by combustion residues after each regeneration, which slows down clogging by soot between two regenerations, but also because a greater number of regenerations is possible, the combustion residue storage volume being greater.

The motorist can therefore travel a greater distance without performing any maintenance on the filter.

TABLE 1

| | Passage density (cpsi) | Wall thickness (μm) | Ratio of asymmetry | r = Ve/Vs | Outlet passage hydraulic diameter (mm) | Filtering area per liter of filter unit (m²/l) | t(min) for dP = 150 mbar (clean filter unit) | t(min) for dP = 100 mbar (clean filter unit) | t(min) for dP = 150 mbar (clogged filter unit) | dP (mbar) for t = 0 (clean filter unit) |
|---|---|---|---|---|---|---|---|---|---|---|
| Ref. | 200 | 350 | 0 | 1 | 1.45 | 0.918 | 481 | 319 | 134 | 26.7 |
| Ex1 | 250 | 350 | 0 | 1 | 1.26 | 0.997 | 495 | 341 | NA | 28.7 |
| Ex2 | 250 | 350 | 10% | 1.986 | 1.03 | 1.149 | >600 | 443 | 279 | 33.9 |
| Ex3 | 250 | 350 | 20% | 4.806 | 0.74 | 1.283 | 522 | 100 | NA | 89.6 |
| Ex4 | 250 | 300 | 10% | 1.867 | 1.09 | 1.183 | >600 | 508 | 337 | 27.8 |
| Ex5 | 250 | 300 | 15% | 2.66 | 0.97 | 1.25 | >600 | 514 | NA | 36.8 |
| Ex6 | 250 | 300 | 20% | 4.061 | 0.82 | 1.314 | >600 | 376 | NA | 60.5 |
| Ex7 | 250 | 400 | 10% | 2.099 | 0.97 | 1.115 | >600 | 372 | NA | 41.8 |
| Ex8 | 200 | 350 | 10% | 1.883 | 1.2 | 1.05 | >600 | 412 | 264 | 29.7 |
| Ex9 | 200 | 350 | 15% | 2.723 | 1.06 | 1.111 | >600 | 411 | 309 | 38.7 |
| Ex10 | 200 | 350 | 20% | 4.223 | 0.89 | 1.168 | >600 | 281 | 284 | 63.8 |
| Ex11 | 300 | 350 | 10% | 2.054 | 0.9 | 1.233 | >600 | 446 | NA | 39.5 |
| Ex12 | 200 | 350 | 2% | 1.132 | 1.4 | 0.946 | 516 | 342 | 160 | 26.3 |
| Ex13 | 200 | 350 | 5% | 1.365 | 1.33 | 0.987 | 566 | 374 | 200 | 26.6 |
| Ex14 | 100 | 500 | 10% | 1.367 | 1.88 | 0.696 | 307 | 180 | 121 | 35.7 |
| Ex15 | 150 | 400 | 10% | 1.363 | 1.54 | 0.856 | 441 | 288 | 200 | 28.8 |

"NA" means "not available".

Table 1 and FIGS. 4 and 5 indicate that:

For new filter bodies, the greater the filtering area, the slower the head loss increases over time. In other words, the loading slope decreases as the filtering area increases. However, the filtering area is not the only criterion, as is shown by comparing example 15 and the reference example. That comparison shows that, according to the invention, a higher ratio r has the advantage of compensating a lower filtering area when the filters are clogged.

Without being bound by any theory, the Applicant explains this phenomenon in the following manner.

A high ratio r means a greater volume in the inlet passages for storing the combustion residues. For a given filtering area and a given combustion residue volume (i.e. a given number of regenerations), the proportion of the filtering area that is According to the invention, the optimum is considered to be having:
a ratio r greater than or equal to 1.15, preferably greater than 1.35, and less than 4, preferably less than 3,
a filtering area at least equal to 0.825 m² per liter of filter unit, and preferably greater than or equal to 0.92 m² per liter of filter unit.

The inlet and outlet passages having a cross section of constant area throughout the length of the filter unit, the increase in the ratio r is the result of increasing the hydraulic diameter of the inlet passages and/or reducing the hydraulic diameter of the outlet passages. Table 1 (see in particular examples 3, 6 and 10) shows that if the hydraulic diameter of the outlet passages is very small, the head loss induced by the clean filter body is much too high. This may prove unacceptable since the official power rating of an engine takes account of the exhaust line.

According to the invention, the hydraulic diameter of the outlet passages must be greater than or equal to 0.9 mm and preferably from 0.95 to 1.4 mm.

Of course, the present invention is not limited to the embodiments shown here and described above, which have been provided by way of illustrative and nonlimiting example.

Thus the invention relates equally to a monolithic filter body. The filter unit could have any shape and any arrangement of the passages.

Finally, the cross section of the passages is not limited to the shapes described.

The invention claimed is:

1. A filter unit for filtering particles contained in exhaust gases of an internal combustion engine, comprising:
    interleaved sets of adjacent inlet passages (10, 11) and outlet passages (12, 13) in fluid communication through lateral walls of said inlet passages (10, 11) and said outlet passages (12, 13),
    said unit including a set of lateral wall portions ($16_1$-$16_8$) forming an intermediate wall (15) between said inlet passages (10, 11) and said outlet passages (12, 13) and having, in cross section, an undulation determined to increase an overall volume of said inlet passages (10, 11) at an expense of an overall volume of the outlet passages (12, 13), and the overall volume (Ve) of said inlet passages (10, 11) being greater that the overall volume (Vs) of said outlet passages (12, 13), wherein,
    a hydraulic diameter of said outlet passages (12, 13) is from 0.9 to 1.4 mm,
    a ratio r of the overall volume (Ve) of the inlet passages (10, 11) to the overall volume (Vs) of the outlet passages (12, 13) is from 1.15 to 4,
    a filtering area is from 0.825 m² to 1.4 m² per liter of said filter unit, and
    a ratio of asymmetry of said undulation is less than 15% and greater than 5%.

2. The filter unit according to claim 1, wherein the hydraulic diameter of said outlet passages (12, 13) is greater than 0.95 mm.

3. The filter unit according to claim 1, wherein said ratio r is greater than 1.35.

4. The filter unit according to claim 1, wherein said ratio r is less than 3.

5. The filter unit according to claim 1, wherein the filtering area is greater than 0.92 m² per liter of said filter unit.

6. The filter unit according to claim 1, wherein said outlet passages (12, 13) have a cross section of constant area throughout a length (L) of said filter unit.

7. The filter unit according to claim 1, wherein said inlet passages (10, 11) and said outlet passages (12, 13) are straight and parallel.

8. The filter unit according to claim 1, wherein said inlet passages (10, 11) and said outlet passages (12, 13) are arranged relative to each other so that all of the exhaust gases filtered by an one of said inlet passages (10, 11) passes into outlet passages (12, 13) adjacent to the one of said inlet passages (10, 11).

9. The filter unit according to claim 1, wherein the ratio of asymmetry of said undulation is less than 12%.

10. The filter unit according to claim 1, wherein said undulation is periodic and a half-period of said undulation extends over a width of one of said passages (10, 11, 12, 13).

11. The filter unit according to claim 1, wherein said undulation has a sinusoidal shape in cross section.

12. A filter body intended for a particle filter, comprising an least one filter unit according to claim 1.

* * * * *